(12) United States Patent
Husband et al.

(10) Patent No.: US 11,187,151 B2
(45) Date of Patent: Nov. 30, 2021

(54) HEAT EXCHANGER

(71) Applicant: ROLLS-ROYCE plc, London (GB)

(72) Inventors: Stephen M. Husband, Derby (GB); Lixin Ren, Bristol (GB)

(73) Assignee: Rolls-Royce PLC, London (GB)

(*) Notice: Subject to any disclaimer, the term of this patent is extended or adjusted under 35 U.S.C. 154(b) by 279 days.

(21) Appl. No.: 16/275,861

(22) Filed: Feb. 14, 2019

(65) Prior Publication Data

US 2019/0271267 A1 Sep. 5, 2019

(30) Foreign Application Priority Data

Mar. 1, 2018 (GB) .................................. 1803316.7

(51) Int. Cl.

| | |
|---|---|
| *F02C 7/14* | (2006.01) |
| *F02C 6/08* | (2006.01) |
| *F02C 7/18* | (2006.01) |
| *F28D 7/00* | (2006.01) |
| *F28D 7/16* | (2006.01) |
| *F02C 7/16* | (2006.01) |
| *F02K 3/115* | (2006.01) |

(Continued)

(52) U.S. Cl.
CPC .................. *F02C 7/14* (2013.01); *F02C 6/08* (2013.01); *F02C 7/16* (2013.01); *F02C 7/185* (2013.01); *F02C 7/20* (2013.01); *F02K 3/06* (2013.01); *F02K 3/115* (2013.01); *F28D 7/00* (2013.01); *F28D 7/0091* (2013.01); *F28D 7/16* (2013.01); *F05D 2250/30* (2013.01); *F05D 2260/213* (2013.01)

(58) Field of Classification Search
CPC .... F02C 7/14; F02C 7/185; F02C 7/16; F02C 7/20; F02C 6/08; F28D 7/162; F28D 9/0093; F28D 2021/0021; F28D 7/16; F28D 7/0091; F28D 7/00; F28F 2210/04; F05D 2260/213; F05D 2250/30; F02K 3/115; F02K 3/06; Y02T 50/60

See application file for complete search history.

(56) References Cited

U.S. PATENT DOCUMENTS

| | | |
|---|---|---|
| 4,474,001 A | 10/1984 | Griffin et al. |
| 4,773,212 A | 9/1988 | Griffin et al. |

(Continued)

FOREIGN PATENT DOCUMENTS

| | | |
|---|---|---|
| EP | 1916399 A2 | 4/2008 |
| EP | 2072763 A1 | 6/2009 |
| GB | 2474567 | 4/2011 |

OTHER PUBLICATIONS

Extended European Search Report from counterpart EP Application No. 19155313.0 dated Jul. 26, 2019, 7 pgs.

(Continued)

*Primary Examiner* — Gerald L Sung
*Assistant Examiner* — Rene D Ford
(74) *Attorney, Agent, or Firm* — Shumaker & Sieffert, P.A.

(57) ABSTRACT

A heat exchanger for a ducted fan gas turbine engine has a low temperature side and plural high temperature sides. The heat exchanger is configured such that heat is extracted from respective engine fluids flowing through the high temperature sides and is received by a portion of a bypass airflow of the engine which, on passing through the fan duct, is diverted through the low temperature side of the heat exchanger thereby cooling the engine fluids.

14 Claims, 5 Drawing Sheets

(51) Int. Cl.
*F02K 3/06* (2006.01)
*F02C 7/20* (2006.01)

(56) References Cited

U.S. PATENT DOCUMENTS

| | | | |
|---|---|---|---|
| 2006/0180703 A1* | 8/2006 | Zielinski | F28D 7/0066 244/57 |
| 2009/0159246 A1* | 6/2009 | Cornet | F01D 25/08 165/138 |
| 2009/0188234 A1* | 7/2009 | Suciu | F02C 7/14 60/262 |
| 2010/0212857 A1* | 8/2010 | Bulin | F02C 7/14 165/41 |
| 2011/0088405 A1 | 4/2011 | Turco | |
| 2014/0202158 A1 | 7/2014 | Storage et al. | |
| 2016/0090863 A1 | 3/2016 | Diaz et al. | |
| 2018/0051946 A1* | 2/2018 | Stambaugh, Sr. | F02C 7/224 |

OTHER PUBLICATIONS

Response to Extended European Search Report from counterpart EP Application No. 19155313.0 dated Jul. 26, 2019, filed Mar. 3, 2020, 45 pgs.

Great Britain search report dated Aug. 22, 2018, issued in GB Patent Application No. 1803316.7.

\* cited by examiner

HEAT EXCHANGER

CROSS-REFERENCE TO RELATED APPLICATIONS

This specification is based upon and claims the benefit of priority from UK Patent Application Number 1803316.7 filed on 1 Mar. 2018, the entire contents of which are incorporated herein by reference.

BACKGROUND

Technical Field

The present disclosure relates to a heat exchanger for a ducted fan gas turbine engine.

Description of the Related Art

Conventionally, electrical generators powered by aero gas turbine engines are cooled using engine oil. The engine oil in turn is cooled, and one option is to use a fuel oil heat exchanger which transfers heat from the engine oil into the fuel stream for the engine.

It is also known to mount heat exchangers to suspension pylons of ducted fan gas turbine engines. In particular, such a pylon typically extends across the fan duct of the engine in order to mount the engine to the airframe, and the heat exchanger can be used to cool hot compressed air bled from a compressor section from the engine using cooler ambient air passing through the fan duct of the engine. The cooled compressed air can then be used in the aircraft, e.g. for de-icing, cabin pressurisation and pneumatic actuation of devices.

As engines increase in power, the engine cooling requirements also increase and accordingly higher demands are placed on heat exchangers for cooling engine fluids.

SUMMARY

According to a first aspect there is provided a heat exchanger for a ducted fan gas turbine engine, the heat exchanger having a low temperature side and plural high temperature sides, the heat exchanger being configured such that heat is extracted from respective engine fluids flowing through the high temperature sides and is received by a portion of a bypass airflow of the engine which, on passing through the fan duct, is diverted through the low temperature side of the heat exchanger thereby cooling the engine fluids.

Advantageously, by cooling plural engine fluids in a heat exchanger which uses the bypass airflow of the engine to cool the fluids, cooling effectiveness of the fluids can be enhanced, particularly in larger engines. Moreover, using this type of cooling for plural fluids allows the heat exchanger to be readily adapted to accommodate differing air frame requirements and cooling burdens. For example, in a "more electric" engine which provides no or reduced amounts of compressed air to the aircraft, but instead provides more electrical power, there is an increased need for cooling of engine electrical components and a corresponding reduction in need for cooling of compressed air; the heat exchanger can accommodate this, for example, by having more of the high temperature sides dedicated to cooling electrical component coolant and fewer dedicated to cooling compressed air, and/or by enhancing the heat exchange effectiveness of a high temperature side dedicated to cooling electrical component coolant at the expense of the heat exchange effectiveness of a high temperature side dedicated to cooling compressed air. Thus the heat exchanger can provide a common thermal management platform for a wide variety of engine types.

Thus, in a second aspect there is provided a heat exchange system including the heat exchanger according to the first aspect, and further including respective circuits for the flow of the engine fluids, wherein each circuit flows the respective engine fluid in a closed loop between its high temperature side of the heat exchanger and a respective component of the engine, the respective engine fluid acting as a coolant for that component.

For example, two or more of the components may be electrical components. In particular, a first one of the components may be an electrical machine (e.g. a motor or a generator) and a second one of the components may be an electrical power converter.

In a third aspect there is provided a ducted fan gas turbine engine having the heat exchanger according to the first aspect or having the heat exchange system according to the second aspect.

Optional features of the present disclosure will now be set out. These are applicable singly or in any combination with any aspect of the present disclosure.

The heat exchanger may be further configured such that the low temperature side returns the diverted portion of the bypass airflow to the fan duct.

Conveniently, the heat exchanger may be for mounting to a suspension pylon extending across the fan duct of the engine.

The heat exchanger may further have heat flow paths for the extracted heat, the heat flow paths extending from surfaces of the high temperature sides in contact with the engine fluids to surfaces of the low temperature side in contact with the diverted portion of the bypass airflow, the paths being entirely solid state. In this way there is no need for the heat exchanger to employ e.g. an intermediary fluid transferring heat in a separate circuit between the high temperature sides and the low temperature side. Thus the heat exchanger can be compact, for example so that both the high and low temperature sides are located at the suspension pylon.

Conveniently, the heat exchanger can be a shell-and-tube type heat exchanger, the low temperature side of the heat exchanger being formed by plural tubes which convey the diverted portion of the bypass airflow, and each high temperature side being formed by a respective shell which surrounds the tubes and through which the respective engine fluid flows so that the tubes are immersed in the engine fluid flows.

The high temperature sides may be arranged in series so that the diverted portion of the bypass airflow receives the extracted heat from the engine fluids sequentially as it flows through the low temperature side. In particular the high temperature sides can be arranged so that engine fluids having higher cooling requirements are earlier in the series so that they are cooled by the diverted portion of the bypass airflow before engine fluids having lower cooling requirements.

The plural high temperature sides may be configured to receive two or more different engine fluids. For example, the engine fluids of the plural high temperature sides may be water-based, oil-based and air-based. By way of another example, the engine fluids of the plural high temperature sides may be water-based and air-based.

The heat exchanger may have three or more high temperature sides for respective engine fluids. For example, the engine fluids of the three high temperature sides may be respectively water-based, oil-based and air-based. Another possibility is that the engine fluids may be respectively water-based, water-based and air-based.

The heat exchanger may further have duplicates of the low temperature side and the plural high temperature sides such that each engine fluid flows in parallel through two high temperature sides. In this way, the heat exchanger can provide additional cooling channels for redundancy and improved fault tolerance.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
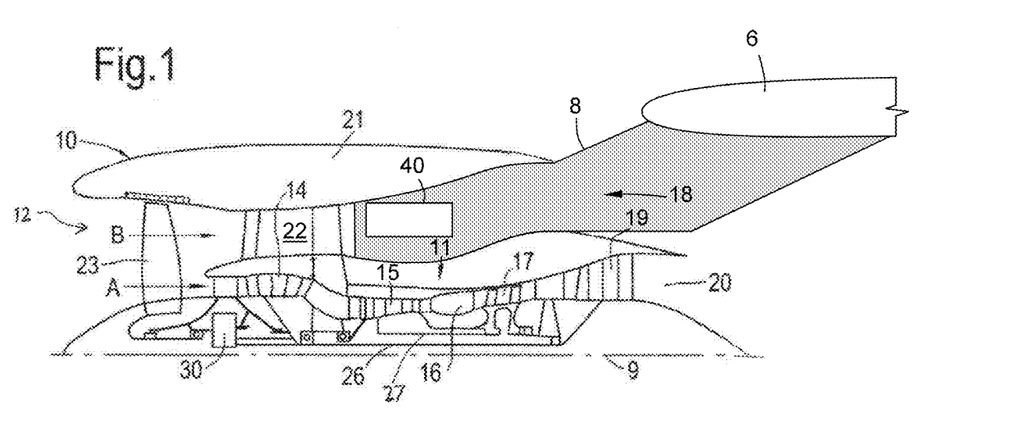
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. The core 11 and the nacelle 21 are attached to the underside of a wing 6 of an aircraft by a faired suspension pylon 8 which reaches forward from the underside of the wing 6 to attachment points on the core 11 and the nacelle 21. In reaching to the core 11, the suspension pylon 8 extends across, and forms a bifurcation in, the bypass duct 22.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
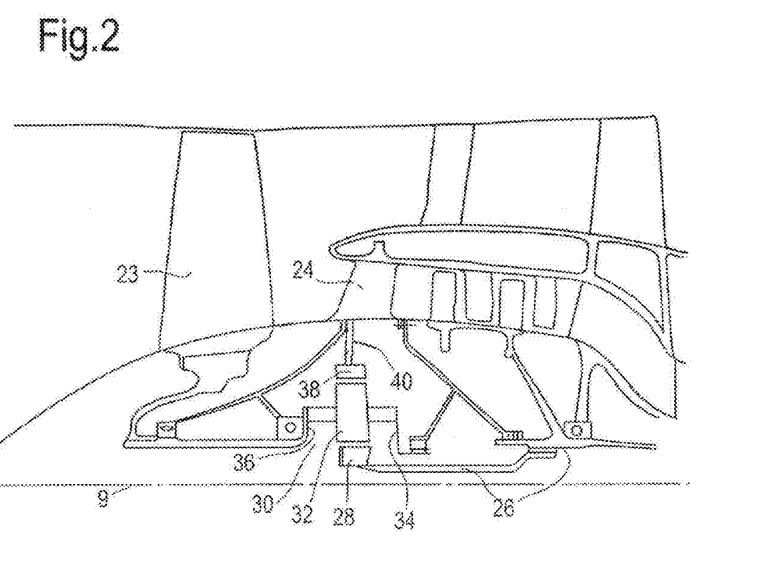
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 39, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
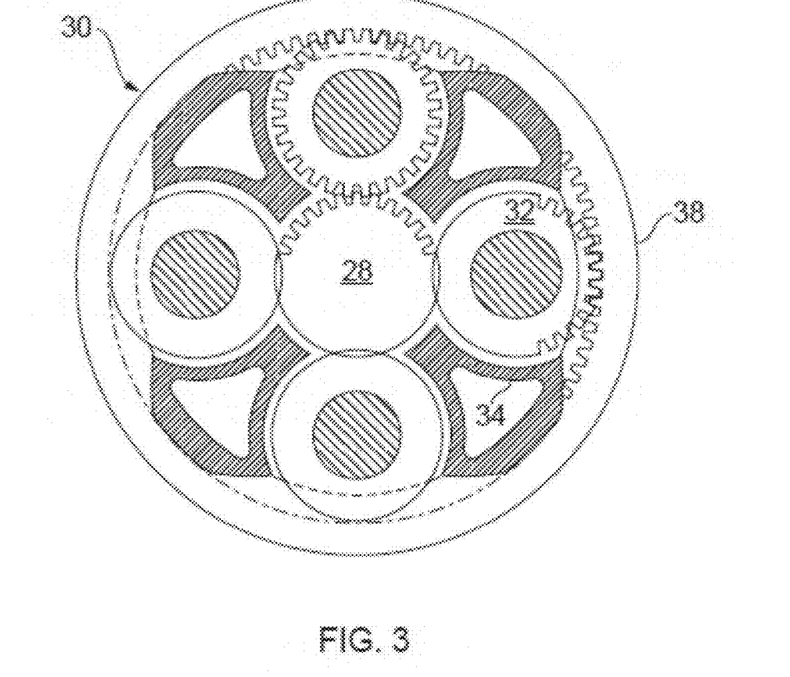
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 39 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 8:
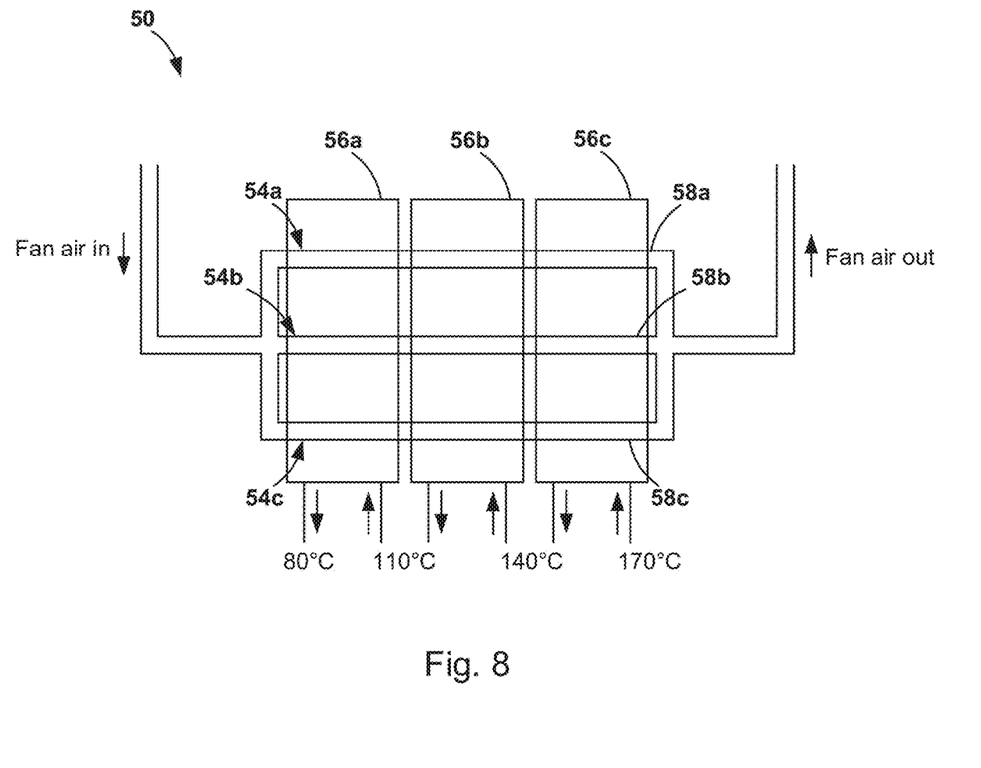

The gearbox 30 and electrical components of the engine 10 impose a significant cooling burden on the cooling system of the engine. Thus the engine 10 has a heat exchanger 40 for engine fluids which can conveniently be mounted to the suspension pylon 8 within the bypass duct 22, as shown schematically in FIG. 1. The heat exchanger 40 is shown schematically in FIG. 4 and has a low temperature side (also referred to as a low temperature portion) 42 through which a diverted portion of the bypass airflow B is passed, before being returned to the bypass duct 22, and has plural (in this example three) high temperature sides (also referred to as high temperature portions) 44a-c through which respective engine fluids flow (which in this example are water-based, oil-based and air-based). Conveniently, as shown in FIG. 8, the heat exchanger 40 can be constructed as a shell-and-tube type heat exchanger 50 in which the low temperature side or portion 42 is formed by plural tubes 54a-54c which convey the diverted bypass airflow, and the high temperature sides 44a-c are formed by respective shells 56a-56c surrounding the tubes 54a-54c. The engine fluids flow through their respective shells to immerse the tubes in the engine fluid flows. This type of heat exchanger therefore has purely solid state heat flow paths (i.e. the walls 58a-58c of the tubes 54a-54c) for the extracted heat, enabling a compact form of heat exchanger. Approximate temperatures for the inflows and outflows of the engine fluids are indicated in FIGS. 4 and 8.

The water-based fluid may be, for example, a water/glycol solution, which can be used for cooling electrical components such as an electrical machine (motor or generator) and/or a power converter. These electrical components may be mounted to the core 11 of the engine 10 and thus may require enhanced cooling relative to e.g. nacelle-mounted components. The oil-based fluid can be lubricating oil used to lubricate the engine 10 and in particular the gearbox 30. The air-based fluid can be compressed air bled from the low pressure compressor 14 or the high-pressure compressor 15 and used in the engine e.g. for cooling further electrical components and/or can be used in the aircraft e.g. for de-icing, cabin pressurisation and pneumatic actuation of devices. Thus heat exchanger 40 is part of a wider heat exchange system which also includes respective circuits for the flow of the engine fluids. In particular, each circuit flows the respective engine fluid in a closed loop between its high temperature side 44a-c of the heat exchanger 10 and a respective component of the engine so that the engine fluid can act as a coolant for that component.

Figure 4:
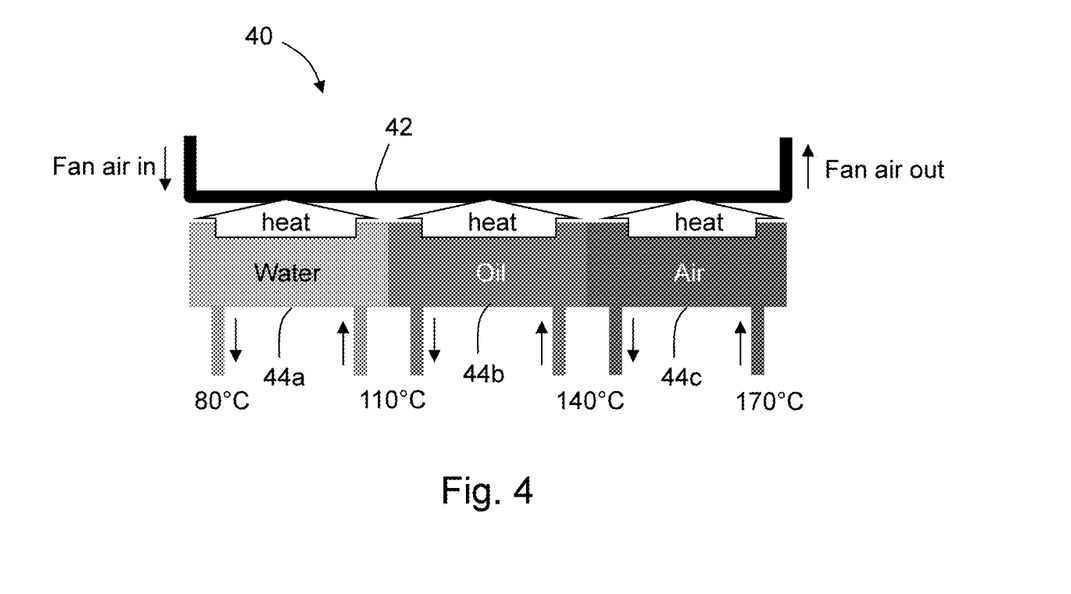
FIG. 4 shows schematically a heat exchanger for a gas turbine engine.

As shown in FIG. 4, the high temperature sides 44a-c can be arranged in series so that the diverted bypass airflow receives the extracted heat from the engine fluids sequentially as it flows through the low temperature side 42. The high temperature side for the engine fluid with the highest cooling requirement (in this example the water-based fluid) can then be placed first in the series, with the high temperature side for the engine fluid with the intermediate cooling requirement (in this example the oil-based fluid) placed second in the series, and the high temperature side for the engine fluid with the lowest cooling requirement (in this example the air-based fluid) placed last in the series.

Figure 5:
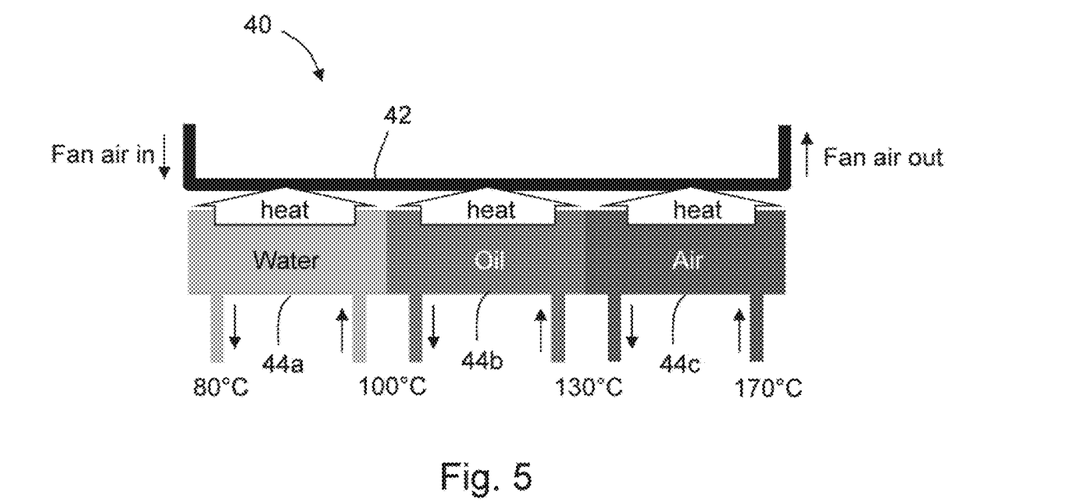
FIG. 5 shows schematically a variant heat exchanger for a gas turbine engine.

Advantageously, the heat exchanger can be readily adapted to accommodate different air frames and different cooling burdens. Thus FIG. 5 shows a variant of the heat exchanger 40 for an engine in which the engine lubricating oil and the compressed air have increased cooling burdens and the water/glycol solution has a reduced cooling burden.

Figure 6:
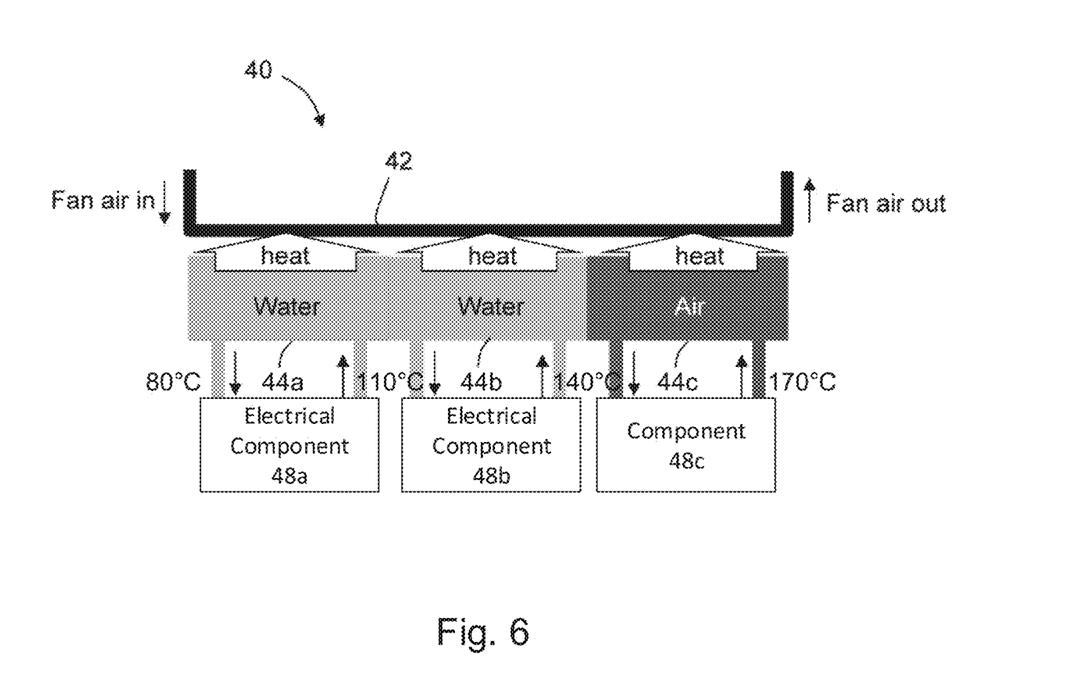
FIG. 6 shows schematically a further variant heat exchanger for a gas turbine engine.

The heat exchanger general architecture and location is unchanged, but the effectiveness of the high temperature sides 44b, 44c are increased at the expense of the high temperature side 44a, resulting in changes to some of the inflow and outflow temperatures of the engine fluids. FIG. 6 shows a further variant of the heat exchanger 40 for a "more electric" engine in which the intermediate high temperature side or portion 44b is used to cool water/glycol solution for another cooling circuit for a second electrical component 48b instead of cooling engine lubricating oil. In the example of FIG. 6, the first high temperature portion 44a is used to cool water/glycol solution for a first electrical component 48a, and the third high temperature portion 44c is used to cool air for a third component 48c. In some examples, first electrical component 48a may be an electrical machine and second electrical component 48b may be a power converter.

Figure 7:
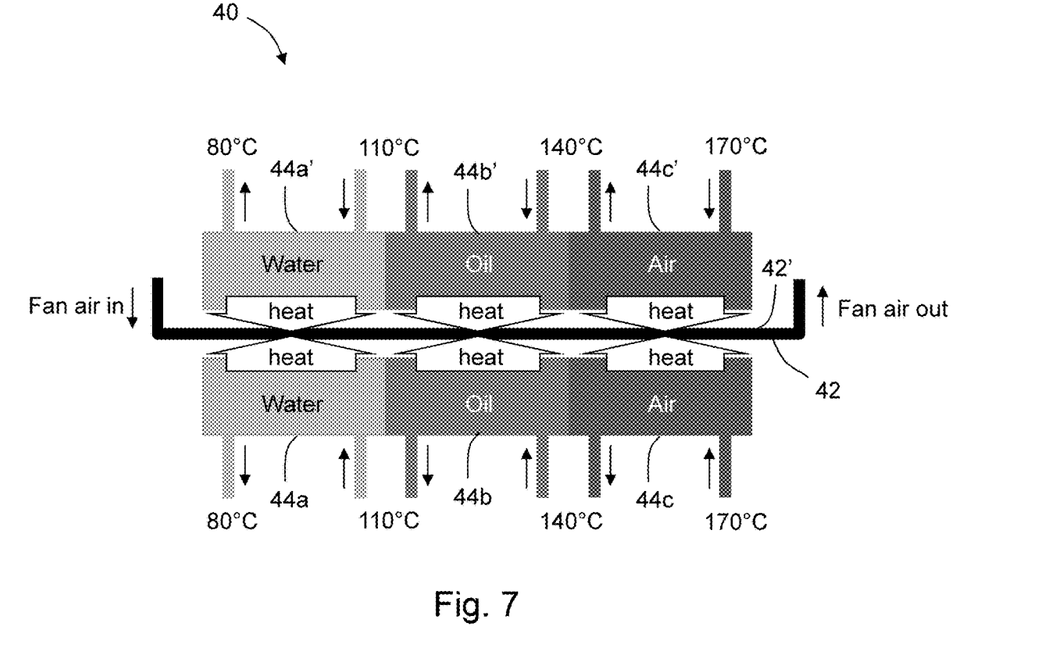
FIG. 7 shows schematically a further variant heat exchanger for a gas turbine engine.

In order to improve the fault tolerance of the heat exchanger 40, the low and high temperature sides 42, 44a-c of the heat exchanger can be duplicated 42', 44a-c', as shown schematically in the further variant of FIG. 7, thereby providing redundancy for each engine cooling circuit. More particularly, each engine fluid flows in parallel through two high temperature sides 44a, 44a'; 44b, 44b'; 44c, 44c'. This parallel flow can be limited to the heat exchanger 40 or the redundancy can be extended to the cooling circuits of the wider heat exchange system, i.e. so that there are parallel closed loop circuits for each engine fluid.

To illustrate the utility of the heat exchanger and its applicability across a wide variety of platforms, it is helpful to consider three different engine types:

1) Bleed engine. This is a conventional engine. A bleed of engine compressed air is cooled by the heat exchanger to a temperature that is safe for distribution around the aircraft. Hydraulic fluid for the aircraft is also provided by the engine, and electrical power is delivered to the aircraft from the engine. The level of electrical power may be about 90 kW (per engine) for a conventional A/C aircraft electrical system. The electrical power may typically be provided by two electrical machines that are oil cooled on the engine.

2) Bleedless engine. This is a more modern conventional engine in which no bleed air is directed to the aircraft from the engine; rather functions that were previously pneumatically powered (e.g. wing anti-icing and engine start and controls) are now electrically powered. Thus the level of electrical power provided by the engine is increased to, for example, about 330 kW. However, hydraulic power is still provided separately by the engine. The electrical power may also still be provided by electrical machines that are oil cooled by the engine, but these have associated power converters which may be located in the fuselage and cooled by aircraft chilled water. The long cable lengths between electrical machine and converter are not desirable and it is preferable to locate the converters within or close to the engine. However, as the converters would then be engine-cooled, this increases the burden on the engine cooling system. The heat exchanger can adapt to this increased burden, while using the same pylon configuration as in the bleed engine.

3) All Electric Aircraft (AEA) engine. AEAs are being actively developed by airframers. In such an aircraft, all the secondary systems are electrical. Accordingly, the level of electrical power that may need to be provided by the engine is further increased to, for example about 400 kW, but no hydraulic and pneumatic fluids are provided. Again, the heat exchanger can adapt to the increased cooling burden for electrical components, while using the same pylon configuration as in the Bleed and Bleedless engine.

Considering the transitions between these engine types:
Bleed and Bleedless. Different aircraft require different ratios of electrical power provision to bleed compressed air provision, depending on where they sit on the spectrum from conventional Bleed with large pneumatic requirements to fully Bleedless. The heat exchanger provides a common thermal management platform for all these aircraft and their engines.

Bleedless and AEA. The transition from Bleedless to AEA increases the electrical system size, although less so than from Bleed to Bleedless. Merely by improving the cooling of the electrical machines and converters it is possible to increase the rating of the power system (e.g. from 330 kW to 400 kW) enough to enable this transition. The heat exchanger can provide a means for achieving this. For example, it can accommodate the replacement of engine oil cooling with water/glycol cooling, water/glycol being a more-effective heat transfer fluid than engine oil.

More generally, in modern and future engine types (i.e. Bleedless and AEA), the amount of cooling required is reduced due to overall optimisation at aircraft level. Spare cooling capacity can thus be used to locate electrical devices in hotter zones of the aircraft. Additionally or alternatively, spare cooling capacity can be re-used for other engine components, reducing the overall cooling burden at engine level. Another option is for the spare cooling capacity to be designed out, reducing the amount of bypass airflow diverted through the heat exchanger and thus providing a fuel burn benefit. The heat exchanger is compatible with all these options.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A heat exchanger for a ducted fan gas turbine engine, the heat exchanger comprising:
 a first arrangement comprising:
  a first low temperature portion; and
  a first plurality of high temperature portions, the heat exchanger being configured such that heat is extracted from respective engine fluids flowing through the high temperature portions and is received by a portion of a bypass airflow of the engine which, on passing through the fan duct, is diverted through the low temperature si-de portion of the heat exchanger thereby cooling the engine fluids, and wherein the first low temperature portion returns the diverted portion of the bypass airflow to the fan duct; and
 a second arrangement that is a duplicate of the first arrangement, the second arrangement comprising:
  a second low temperature portion; and
  a second plurality of high temperature portions, wherein each engine fluid flows in parallel through one of the first plurality of high temperature portions and one of the second plurality of high temperature portions.

2. The heat exchanger according to claim 1, wherein the heat exchanger is configured to be mounted to a suspension pylon extending across the fan duct of the engine.

3. The heat exchanger according to claim 1, which further comprising heat flow paths for the extracted heat, the heat flow paths extending from surfaces of the high temperature portions in contact with the engine fluids to surfaces of the low temperature portions in contact with the diverted portion of the bypass airflow, the paths being entirely solid state.

4. The heat exchanger according to claim 1, wherein the heat exchanger is a shell-and-tube type heat exchanger, the first low temperature portion of the heat exchanger being formed by a plurality of tubes which convey the diverted portion of the bypass airflow, and each of the first plurality of high temperature portions being formed by a respective shell which surrounds the plurality of tubes and through which the respective engine fluid flows so that the plurality of tubes are immersed in the engine fluid flows.

5. The heat exchanger according to claim 1, wherein the first plurality of high temperature portions are arranged in series so that the diverted portion of the bypass airflow receives the extracted heat from the engine fluids sequentially as the bypass airflow flows through the first low temperature portion.

6. The heat exchanger according to claim 1, wherein the first plurality of high temperature portions are configured to receive two or more different engine fluids.

7. The heat exchanger according to claim 1, wherein the first plurality of high temperature portions comprise three or more high temperature portions.

8. The heat exchanger according to claim 7, wherein the engine fluids of the three high temperature portions are either respectively water-based, oil-based and air-based, or respectively water-based, water-based and air-based.

9. A heat exchange system comprising the heat exchanger according to claim 1, and further comprising respective circuits for the flow of the engine fluids, wherein each circuit flows the respective engine fluid in a closed loop between a corresponding high temperature portion of the heat exchanger and a respective component of the engine, the respective engine fluid acting as a coolant for the respective component.

10. A heat exchange system according to claim 9, wherein two or more of the components are electrical components.

11. The heat exchange system according to claim 10, wherein a first component of the two or more components is an electrical machine and a second component of the components is an electrical power converter.

12. A ducted fan gas turbine engine comprising the heat exchange system according to claim 9.

13. A ducted fan gas turbine engine comprising the heat exchanger according to claim 1.

14. The heat exchanger according to claim 1, further comprising a tube that conveys the diverted bypass airflow, wherein the first and second low temperature portions are formed at least in part by opposed walls of the tube.

* * * * *